United States Patent [19]

Nakaishi et al.

[11] Patent Number: 5,167,676
[45] Date of Patent: Dec. 1, 1992

[54] APPARATUS AND METHOD FOR REMOVING PARTICULATE DEPOSITS FROM HIGH TEMPERATURE FILTERS

[75] Inventors: Curtis V. Nakaishi, Morgantown, W. Va.; Norman T. Holcombe, McMurray, Pa.; Paul L. Micheli, Morgantown, W. Va.

[73] Assignee: The United States of America as represented by the United States Department of Energy, Washington, D.C.

[21] Appl. No.: 865,146

[22] Filed: Apr. 8, 1992

[51] Int. Cl.[5] .............................................. B01D 46/04
[52] U.S. Cl. ........................................... 55/96; 55/302; 55/523; 55/DIG. 30; 60/303
[58] Field of Search ................... 55/96, 282, 302, 523, 55/DIG. 30; 60/303

[56] References Cited

U.S. PATENT DOCUMENTS

| | | | |
|---|---|---|---|
| 4,283,207 | 8/1911 | Maxtyniuk | 55/523 X |
| 4,735,638 | 4/1988 | Ciliberti et al. | 55/302 |
| 4,902,309 | 2/1990 | Hempenstall | 55/96 X |

Primary Examiner—Charles Hart
Attorney, Agent, or Firm—David E. Breeden; Stephen D. Hamel; William R. Moser

[57] ABSTRACT

A combustion of a fuel-air mixture is used to provide a high-temperature and high-pressure pulse of gaseous combustion products for the back-flush cleaning of ceramic filter elements contained in a barrier filter system and utilized to separate particulates from particulate-laden process gases at high temperature and high pressure. The volume of gaseous combustion products provided by the combustion of the fuel-air mixture is preferably divided into a plurality of streams each passing through a sonic orifice and conveyed to the open end of each filter element as a high pressure pulse which passes through the filter elements and dislodges dust cake supported on a surface of the filter element.

14 Claims, 1 Drawing Sheet

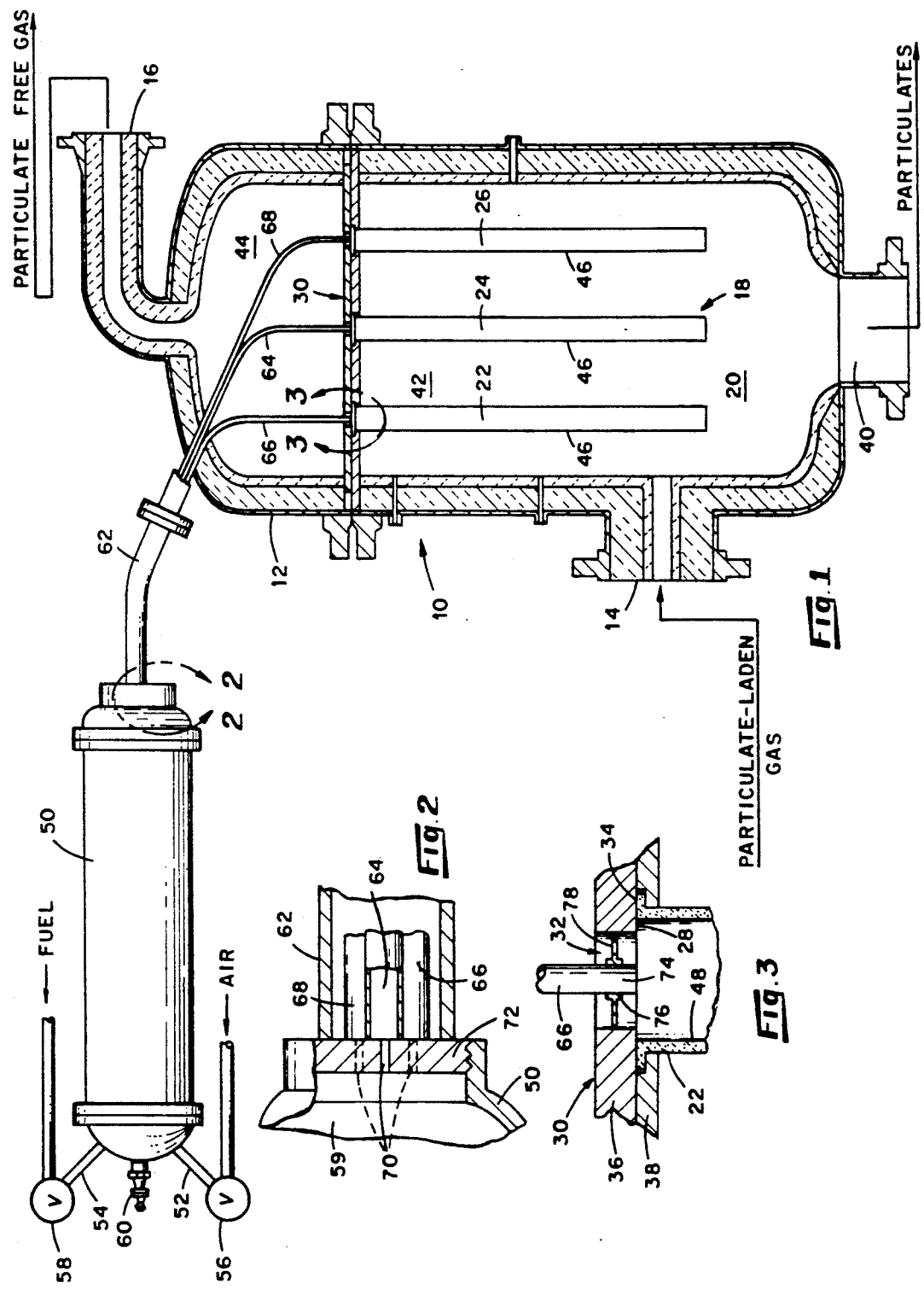

APPARATUS AND METHOD FOR REMOVING PARTICULATE DEPOSITS FROM HIGH TEMPERATURE FILTERS

The Government has rights in this invention pursuant to the employer-employee relationship of the U.S. Department of Energy and the inventors.

BACKGROUND OF THE INVENTION

The present invention relates generally to the removal of particulate deposits or dust-cake from surfaces of filters used for cleaning particulate-laden gas streams at high temperature and high pressure, and more particularly to the apparatus and method for cleaning such filters by back-flushing the filters with a pulse of hot gas from a combustion mechanism.

The gasification or combustion of carbonaceous materials such as coal, peat, bio-mass, and waste products produce process gases which are laden with particulate material. Before these hot gases can be discharged into the atmosphere or utilized in energy consuming systems such as gas turbines all, or essentially all, of the particulates in the process gases have to be removed from the process gases in order to satisfy environmental regulations as well as to protect system components such as gas turbines or heat exchangers. Waste incinerators also produce process gas streams which require particulate removal before the gas streams are discharged in the environment or otherwise used. Process gas streams such as utilized as the motive fluid for a gas turbine are provided to the turbine at a relatively high temperature and pressure for effecting the efficient extraction of the energy values in the process gas.

Various filtering techniques have been utilized to remove particulate material from process gas streams, including those at elevated temperatures and pressures. For example, barrier filters, "screenless grannular" bed filters, acoustic agglomeration, nested fiber filters, and cyclones have been satisfactorily used for stripping particulates from high-temperature and high-pressure gas streams.

Of these techniques, it has been found that barrier filter systems employing ceramic filter elements provide one of the most effective mechanisms for removing the particulate material from process gas streams at high temperature and high pressure. Barrier filter systems are normally provided by supporting a plurality of ceramic gas filter elements within a pressure vessel. A tubesheet with the filter elements separates the pressure vessel into a dirty gas zone which contains the particulate laden gas and a clean gas zone which contains the essentially particulate-free gas. Normally, the gas filter elements are attached directly to the tubesheet but they can be mounted in plenums supported by the tubesheet. Barrier filter systems utilize filter elements of different configurations such as cross-flow filters as disclosed in U.S. Pat. Nos. 4,343,631, 4,735,638, 4,737,176, and 4,764,190, or candle filters as disclosed in U.S. Pat. No. 2,548,878 and German patents 3515345 and 3515364. The preferred barrier filter elements are formed of ceramic materials such as silicon carbide, mullite, or aluminates since such materials exhibit high resistance to corrosion and mechanical degradation by exposure to particulate-laden process gases at high temperature and high pressure such as produced by the combustion or gasification of coal.

In the operation of a barrier filter, a substantial portion of the particulates in the process gas in the dirty gas zone contacting the exposed surfaces of the gas permeable filter elements remain on or just below the surface of the filter elements to form a layer of particulate material, usually referred to as filter-cake or dust-cake. With pore construction of the filter element, differential pressure across the filter elements increases with increasing thickness of the dust-cake until the pressure drop across the filter elements reaches an unsatisfactorily high level so as to require the removal of the dust-cake. Usually, the removal of this dust-cake is periodically required to maintain acceptable pressure drops across the filter elements. The dust-cake build-up and cleaning times are determined by either selecting a maximum allowable pressure drop or by cleaning the filters at preset intervals.

The removal of the dust-cake from the filter elements in the barrier filter system can be effected by back-flushing the filter elements with high pressure gas. A previously employed back-flushing technique used a stream of relatively cold nitrogen or air at high pressure to clean the filter elements of either the candle or the cross-flow type. In using this back-flushing technique, a high pressure vessel is required for storing or a high-pressure compressor for supplying the gas used for the cleaning operation. Also, rapid responding valving systems are required to provide high pressure pulses of nitrogen or air to the "clean side" of the filter elements for back-flushing the latter. This cleaning operation can be conducted while the barrier filter is on-line, i.e., while the process gas is flowing through the filter system, or off-line, i.e., when the barrier filter is isolated from the process gas stream. It has been found that the on-line cleaning of the barrier filters substantially reduces the number of barrier filter vessels required so as to significantly reduce the overall cost of the filter system.

However, the use of the relatively cold back-flushing gases has caused some problems since these gases are injected into the barrier filters at temperatures considerably less than that of on-line filter components so as to thermally shock and often cause a premature failure of the ceramic filter elements, produced by contacting the filter elements with the pulse of cold air or nitrogen. Efforts have been made to reduce thermal shock problems by warming the relatively cold back-flushing gases prior to any contact thereof with the filter elements. One such effort incorporated a venturi above each of the filter elements so that the pulse gas functions as an inductor for pulling hot process gas into the filter element during the back-flushing operation. While this technique did provide some warming of the air, it was found that when the filter system is on-line the presence of these ventures resulted in an undesirable filter system pressure loss during operation, excluding the cleaning periods.

Another technique utilized for cleaning filter elements was the use of acoustic energy from a pulse combustor as practiced in the cleaning of nested fibers and described in the publication "Advanced Development of the Nested Fiber Filter," Battelle Status Report, Battelle National Laboratory at Columbus, Ohio, May, 1990. There will be difficulties with the pulse technique in a full-scale barrier filter system in which several thousand filter elements are normally utilized. The problems associated with monitoring or controlling the operation of several thousand pulse combustors or even manifolding these several thousand pulse combustors is considered to be impractical, if not impossible.

A pulse combustor operates on the basis of acoustic coupling with the chamber, and would be upwards of twenty cylces per second, whereas a pulse is generated after hundreds of minutes of operation and for periods of seconds, hence long time scales compared to pulse combustion. While a pulse combustor could be made to operate over the short burst-time, the shaping of the pulse is not practical and proper timing is expected to be impossible since the pulse combustor takes a "long" time to achieve thermal conditions that produce acoustic coupling.

Another problem foreseen in using acoustic energy from pulse-type combustors for filter cleaning is that the filter elements could be excessively and deleteriously vibrated by the acoustic energy in the filter cleaning operation.

SUMMARY OF THE INVENTION

A primary aim or objective of the present invention is to provide a simple, relatively inexpensive combustion system for providing a distinct high pressure pulse of hot combustion gases for back-flush cleaning caked particulate material from ceramic barrier filters, especially those of the candle or cross-flow type, particularly while the barrier filter is in an on-line mode. The utilization of a pulse of gaseous combustion products at high temperature and high pressure significantly reduces or obviates thermal shocking and vibration of the ceramic filter elements and eliminates the need for high-temperature valves which limit system performance and thus considerably reduces the overall cost of equipment required for satisfactorily cleaning the filter elements.

Another object of the present invention is to provide a stream of gaseous combustion products in the form of a single pulse of gas that is at a temperature essentially corresponding to the process gas temperature to prevent the thermal shocking of the ceramic filter elements.

Another object is to provide a pulse gas flushing system for cleaning ceramic filters wherein the combustion system providing the pulse of gaseous combustion products utilizes a spark type ignition arrangement which ignites a mixture of air and fuel (gas or liquid) for providing a rapidly applied pulse of hot gases which is at a sufficient pressure to back-flush clean the filter elements.

A further object is to provide a high-temperature and high-pressure pulse of gaseous combustion products that are of a reducing or oxidizing nature so as to correspond to that of the particulate-laden process gas to minimize corrosion of ceramic filter elements and downstream components. The apparatus of the present invention is utilized for pulse cleaning particulate material from surfaces of filter elements in a barrier filter system which comprises a plurality of gas-permeable filter means contained within pressure vessel means having first and second zones. Each of these filter means has a first surface in registry with the first zone and a second surface in registry with the second zone. The first surface of each filter means is adapted to be contacted by a particulate-laden process gas stream at an elevated temperature and pressure for removing particulate material from the process gas stream while the process gas passes through the filter means and into the second zone. Generally, this apparatus comprises combustion chamber means, means for introducing a charge of fuel and oxidant into the combustion chamber means, selectively operable ignition means for rapidly effecting the combustion of the fuel and oxidant charge to provide gaseous combustion products at elevated temperatures and pressures, and a plurality of conduit means each in registry with the combustion chamber means and the second surface of each of the plurality of filter means. These conduit means each convey a stream of gaseous combustion products from the combustion chamber means into contact with the second surface of each filter means at a sufficiently high pressure for effecting the passage of the gaseous combustion products through the filter means to engage and dislodge said particulate material supported by the first surface of the filter means.

Sonic orifices are operatively associated with each of the conduit means for controlling the flow rate of the gaseous combustion products forming each high-pressure pulse.

The method for removing particulate material supported on the first surface of the filter means comprises the steps of providing a quantity of gaseous combustion products, separating the quantity of gaseous combustion products into discrete streams of gaseous combustion products, contacting the second surface of each of the filter means in registry with the second zone with one of the streams of gaseous combustion products for effecting the flow thereof through each of the filter means to contact and dislodge particulate material supported on the first surface of each of the filter means.

Other and further objects of the present invention will become obvious upon an understanding of the illustrative embodiment and method about to be described or will be indicated in the appended claims, and various advantages not referred to herein will occur to one skilled in the art upon employment of the invention in practice.

While the following description is primarily directed to the use of the back-flush pulse cleaning of candle type barrier filter systems, it is to be understood that the apparatus and method of the present invention could readily be used for back-flush pulse cleaning barrier filters having filter elements of the cross-flow type.

DESCRIPTION OF THE DRAWINGS

FIG. 1 is a partially sectioned, elevational view illustrating a barrier filter containing a plurality of ceramic candle-type filter elements which are utilized for removing particulates from high temperature and high pressure process gas streams and which are each cleaned in accordance with the present invention by back-flushing with a pulse of gaseous combustion products at high temperature and high pressure;

FIG. 2 is a fragmentary sectional view taken on line 2—2 of FIG. 1 showing details of the sonic orifice utilized at each of the connections of the individual conduits coupling the individual candle filter elements to the combustion device used for producing the gaseous combustion products; and FIG. 3 is a fragmentary sectional view taken along line 3—3 of FIG. 1 and illustrating a coupling arrangement for the conduits gas-conveying at the open end of each candle filter.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated. Further, while the barrier filter system illustrated in FIG. 1 is shown with three ceramic candle filters, it will appear clear that any suitable number of candle filters may be incorporated in the pressure vessel. This arrangement with three candle filters is merely shown for the purpose of illustration and description. Also, while one combustion device or chamber is shown coupled to the three candle filters through a plurality of conduits, it will appear clear that several combustion chambers could be used so that an adequate pulse of high-temperature and high-pressure gas can be provided for back-flush cleaning of the candle filter elements especially in a pressure vessel containing a substantial number of candle filter elements.

DETAILED DESCRIPTION OF THE INVENTION

As generally described above, the present invention is directed to an apparatus and method for effecting the back-flush, pulse cleaning of candle filters in a barrier filter system. With reference to FIGS. 1 to 3 of the drawing, the high-temperature and high-pressure candle barrier filter generally shown at 10 comprises a vertically oriented cylindrical pressure vessel 12 having an inlet 14 for particulate laden process gas through a side wall thereof at a location generally between the upper end and the lower end of the pressure vessel 12. An outlet 16 is positioned at the top of the pressure vessel 12 for conveying process gas essentially free of particulate material as removed from the process gas by a bank 18 of filter elements disposed within the cavity 20 of the pressure vessel 12.

The bank 18 of gas filter elements is shown comprising three elongating vertically extending filters 22, 24, and 26 which are of the type generally referred to as candle filters which are of tubular configurations each closed at the lower end thereof and having an open top 28 (FIG. 3). These gas-permeable candle filters are preferably formed of a ceramic material such as described above. The candle filters are vertically supported in the vessel 12 at a location adjacent to the upper end thereof by employing a horizontal extending tubesheet 30 having openings 32 therethrough in alignment with the open ends 28 of the candle filters 22, 24, and 26. These candle filters 22, 24, and 26 may be attached to the tubesheet 30 in any suitable manner such as providing the end of the filter elements near the opening 28 with a radially extending flange 34 which may be supported between two horizontally disposed members 36 and 38 of the tubesheet 30.

The pressure vessel 12 is also provided with a solid or particulate discharge 40 at the lower end thereof whereby particulate material removed from the particulate-laden process gas entering the pressure vessel 12 through the inlet 14 by the filter action of the candle filters is removed from the pressure vessel 12 through a suitable valving arrangement (not shown). The interior or cavity 20 of the pressure vessel 12 is divided by the tubesheet 30 and the candle filters 22, 24, and 26 into a first or dirty gas zone 42 and a second or clean gas zone 44. The particulate laden process gas enters the dirty gas zone 42 in the pressure vessel 12 through inlet 14 and contacts the outer surface 46 of the gas permeable candle filters 22, 24, and 26. This process gas passes through the candle filters where the particulate material supported thereby is stripped from the process gas. The "clean" process gas exits the candle filters through the interior surface 48 and enters the clean gas zone 44 located in the upper part of the cavity 20. This process gas in the clean gas zone 44 is essentially free of particulate material and is discharged from the pressure vessel 12 through gas outlet 16 into the environment or conveyed to a suitable point of utilization such as a gas turbine (not shown).

The particulars of the high-temperature and high-pressure barrier filter system employing the pulse filter cleaning apparatus of the present invention is not deemed to be critical to the practice of the present invention since the apparatus of the present invention can be utilized to clean filter elements in barrier filter systems which contain more or less than the three candle filters illustrated. Further, the candle filters may be disposed in several different plenums within the pressure vessel and/or be supported by various zone separating mechanisms or tubesheets. Also, as mentioned above it will appear clear that the hot gas pulse cleaning apparatus of the present invention may be utilized to clean barrier filters containing cross-flow filters of the type illustrated in U.S. Pat. No. 4,343,631. Thus, the structural details of the pressure vessel containing the high-temperature and high-pressure barrier filters as described above are not deemed to be at the point of the present invention and could be modified or otherwise provided by any well known high-temperature and high-pressure barrier filter systems containing, for example, ceramic membrane barrier type, candle-type or cross-flow type gas filters.

In accordance with the present invention, barrier filter assemblies such as described above that are suitably used with high-temperature and high-pressure particulate-laden process gases are periodically cleaned of the filter cake or layers of particulate materials supported on the outer surface of the gas filter elements such as candle filters 22, 24, and 26 by back-flushing with a discrete pulse of high temperature and high pressure gas. As shown in FIGS. 1-3, the hot gas pulse cleaning system comprises a combustor 50, typically of an elongated cylindrical configuration, which is provided at one end thereof with an oxidant or air inlet line 52 and a fuel (liquid or gaseous) inlet line 54. These inlet lines 52 and 54 are respectively provided with fast acting valves 56 and 58 such as solenoid-type valves for providing a rapid and positive control over the quantity of air and fuel charged into the interior 59 of the combustor 50.

An ignition device in the form of a spark plug 60 is disposed at the end of the combustor 50 near and preferably intermediate the air and fuel inlets 52 and 54. The spark plug 60 is utilized to provide for the ignition of the fuel air mixture or charge in the combustor 50 to provide a volume of gaseous combustion products which undergo a rapid increase in pressure within the interior 59 of the combustor 50 as the combustion of the fuel-air charge proceeds. By employing a spark plug-type ignition system, the rapid combustion of the fuel-air charge is achieved within the combustor 50 to provide the volume or quantity of gaseous combustion products at a temperature sufficiently high so as to inhibit thermal shocking of the ceramic filter elements 22, 24, and 26 contacted thereby. Also, the gaseous combustion products are at a pressure sufficiently high to be injected into the candle filters in the form of a high pressure pulse which passes through the porous filter elements 22, 24 and 26 in direction opposite to that of the particulate-laden process gas so as to dislodge the filter cake or dust-cake from the outer surfaces 22 of the candle filters 22, 24, and 26.

To provide for the delivery of the filter-cleaning pulse of the gaseous combustion products to the candle filters, the combustor 50 is provided with a discharge line 62 at the end of the combustor 50 opposite to the fuel air inlet with this discharge line 62 extending from the combustor 50 to the pressure vessel 12 where the line 62 is suitably attached. This discharge line 62 is shown containing a plurality of conduits 64, 66, and 68 each having one end in registry with the interior 59 of the combustor 50 and an opposite end extending to the open upper end 28 of each candle filter 22, 24, and 26. As best shown in FIG. 2, each of these conduits 64, 66, and 68 is provided with a sonic orifice or restrictor 70 at the end of the conduit in communication with the interior 59 of the combustor 50. These sonic orifices may be provided by fitting each conduit 64, 66, or 68 with a sonic orifice at a suitable location therein or by employing an end plate 72 at the end of the combustor 50 and providing this end plate 72 with the sonic orifices. The line 62 and the conduits 64, 66, and 68 may be attached to the end plate 72 in any suitable manner such as by welding or by using a suitable bolting arrangement. The sonic orifices are associated with each conduit 64, 66, and 68 to control the flow rate of the gaseous combustion products froom the combustor 50 since each sonic orifice effectively decouples the combustor 50 from the pressure vessel, allowing the ignition process in the combustor 50 to be controlled without consideration of the downstream volumes.

With reference to FIG. 3, one end 74 of the conduit 66 is shown in registry with open upper end 28 of the candle filter 22 with the conduit 64 preferably attached to the tubesheet 30 so as to be centrally disposed within the opening 32 in the tubesheet 30. The conduits 64 and 68 are similarly disposed with respect to candle filters 24 and 26. The conduit 66, as shown, is attached to the tubesheet 30 by an annular plate generally shown at 76 which has slots or perforations 78 extending therethrough for the passage of particulate-free process gas about the exterior of the conduit 66. The opening 32 through the tubesheet 30 as well as the perforations 78 through the plate 76 are of a size sufficient to permit the hot process gas to pass from the candle filter 22 into the clean zone 44 with minimal pressure drop. The conduits 64, 66, and 68 are preferably held in position near the opening into the candle filters 22, 24, and 26 to assure that these conduits are properly aligned with the interior of the candle filters and to assure that the conduits will not be dislodged during the passage of the hot pulse cleaning gas from the combustor 50 into the candle filters. Also, the conduits 64, 66, and 68 may be provided with loops (not shown) along the length thereof to allow for thermal expansion.

In operation, fuel and air are admitted into the combustor 50 until there is a sufficient charge of the fuel-air mixture within the combustor 50 to provide the volume of gaseous combustion products needed for the back-flush pulse cleaning of the candle filters. The ignition system 60 is operated to ignite the fuel-air mixture within the combustor 50 to provide the required volume of gaseous combustion products at the desired temperature and pressure. These gaseous combustion products are discharged from the combustor 50 through each of the sonic orifices 70 and into the interior of the filters 22, 24, and 26 through the conduits 66, 64, and 68 respectively, to back-flush the filter elements 22, 24, and 26. The sonic orifices 70 provide a pulse of gaseous combustion products at a sufficiently high flow rate to back-flush the candle filters. Each pulse is provided at a relatively low volume flow rate but at a sufficiently high pressure to penetrate through the permeable candle filters 22, 24, and 26 and dislodge the dust cake from the exterior surface 46 thereof.

The particular temperature and pressure of the combustion gases provided by the fuel-air mixture are dependent upon the particular configurations of the candle filter as well as the number of filter elements being serviced by a single combustor. Of course, it will appear clear that with a pressure vessel containing a substantially greater number than the three filter elements illustrated that several combustors may be utilized. These combustors may be actuated simultaneously or in a predetermined sequence so that effective cleaning of the filter elements may be achieved. The temperature of the combustion gases exiting the combustor 50 through the orifices 70 is preferably at essentially process temperature encountered by the filter elements while the pressure of these gases is preferably in a range of about two to ten times the system pressure.

The volume flow rate through the filter elements is lower at higher gas pressures and, hence, the volume flow rate dominates the design of the filter system since the number of filter elements required is proportional to the velocity of the gas and flow area provided by the filter elements. The size and number of the pulse gas cleaning arrangements utilized are also dependent upon the through velocity and the flow area provided by the candle filters. Thus, the size and number of pulse gas cleaning arrangements selected are such as to assure that a sufficient volume of gaseous combustion products can be directed into the candle filters for back-flushing and effectively cleaning the filter elements.

In the practice of the present invention, the filter elements within the barrier filter system may be cleaned while the barrier filter system is off-line. However, by employing the pulse gas cleaning arrangement of the present invention, the barrier filter system may be cleaned while the system is on-line since groups of filters can be pulsed together, effectively taking these filters off-line for a short period—the pulse cleaning time. The remainder of the filters operate normally in the meantime, with the process gas being diverted to those filter elements not being cleaned. Further, the temperature of back-flush pulse cleaning gas as provided by the combustor is sufficiently high and generally corresponds to that of the particulate laden process gas so as to assure that deleterious thermal shocking of the filter elements will not occur.

The peak pressure, duration, and the shape of the pressure pulse provided by the combustor through the sonic orifices into the filter elements can be configured to provide the maximum dust-cake removal from the filter elements employed. The pulse pressure peak duration and shape can be effectively controlled by the selection of a particular fuel such as natural gas, propane, gasoline, kerosene, etc., and the combustion rates thereof and by fuel-to-air ratio designed to yield the desired peak pressure, duration, and shape of the pressure pulse. The size of the sonic orifices or nozzles 70 is selected to control the flow rate of the gases from the combustor into the filter elements to assure that the pulse of the combustion gases will be present in a sufficient volume to dislodge the dust cake from the candle filters by back-flush cleaning.

The hot gaseous combustion products provided by the combustor 50 may be tailored to correspond to the reducing or oxidizing nature of the particulate-laden process gas so as to minimize corrosion of the filter elements and downstream components. By controlling the air-to-fuel ratio and by properly selecting the utilized fuel, the required temperature of the gaseous combustion products can be achieved with either a fuel-rich or fuel-lean combustion operation so as to provide the desired reducing or oxidizing nature of the gaseous combustion products.

It will be seen that the back-flush pulse cleaning system of the present invention provides a relatively low cost, high temperature procedure which offers the advantages of no hot gas valves and minimal thermal shock over previously known filter cleaning systems. Further, the use of the sonic orifices in the pulse cleaning arrangement of the present invention eliminates the need of high-pressure, high-temperature valving as previously required for controlling the flow-rate of other hot gas pulse cleaning systems. With time, there is an ever increasing need to operate the systems using process gas at higher and higher temperatures. Thus, metallic alloy valves will soon reach, if they have not already reached, a maximum operating temperature, limited by lack of strength at high temperatures. Such temperatures are well below turbine inlet temperatures so that metallic valves would eventually limit the maximum operating temperature of turbine systems. This valve imposed limitation is obviated by the practice of the present invention.

What is claimed is:

1. Apparatus for pulse cleaning particulate material from surfaces of filter elements in a barrier filter system substantially defined by a plurality of gas-permeable filter means contained within pressure vessel means having first and second zones and with each filter means having a first surface in registry with the first zone and a second surface in registry with the second zone, said apparatus comprising combustion chamber means, means for introducing a charge of fuel and oxidant into the combustion chamber means, selectively operatable ignition means for rapidly effecting the combustion of the fuel and oxidant charge to provide a volume of gaseous combustion products, and a plurality of conduit means each in registry with said combustion chamber means and said second surface of each of said plurality of filter means for conveying a stream of gaseous combustion products from the combustion chamber means in the form of a high-pressure pulse into contact with said second surface of each filter means for effecting the passage of gaseous combustion products through said filter means to engage and dislodge particulate material supported on said first surface of the filter means.

2. Apparatus as claimed in claim 1, wherein sonic orifice means are operatively associated with each of said plurality of conduit means for controlling the flow rate of the gaseous products of combustion conveyed as said high pressure pulse through each of said conduit means.

3. Apparatus as claimed in claim 2, wherein said means for introducing the charge of fuel and oxidant includes separate line means for the fuel and the oxidant and valve means in each of said line means for controlling the volume of fuel and oxidant in said charge to provide a pulse of the gaseous products of combustion in each of said conduit means at a pressure sufficient to effect said passage of the gaseous combustion products through said filter means.

4. Apparatus as claimed in claim 3, wherein said gas-permeable filter means comprises filter elements having an open end thereon, and wherein filter support means are provided for supporting said filter elements in said pressure vessel means with said open end of said filter elements being in open registry with said second zone.

5. Apparatus as claimed in claim 4, wherein said combustion chamber means are disposed external to said pressure vessel means, and wherein said plurality of conduit means extend from said combustion chamber means to a location contiguous to said open end of each of said filter elements.

6. Apparatus as claimed in claim 5, wherein means are provided for attaching the conduit means to the filter support means to maintain the end of the conduit means in registry with the open end of said filter elements.

7. Apparatus as claimed in claim 6, wherein said filter elements comprise elongated tubular ceramic filters, and wherein the filter support means vertically support the filters in the pressure vessel.

8. A method for cleaning gas filter elements in a barrier filter system comprising pressure vessel means containing a plurality of gas permeable filter elements disposed intermediate first and second zones therein and utilized for removing particulate material from particulate-laden process gas at an elevated temperature and pressure by contacting a first surface of the filter elements in said first zone with a stream of particulate-laden process gas for effecting the removal of the particulate material from the process gas stream as it passes through the filter elements into said second zone, said method effecting the removal of particulate material supported on said first surface of the filter elements by the steps comprising a volume of gaseous combustion products, separating the volume of gaseous combustion products into a plurality of discrete streams of gaseous combustion products, contacting a second surface of each of the filter elements in registry with said second zone with one of said streams of gaseous combustion products for effecting the flow thereof through each of said filter elements to contact and dislodge particulate material supported on the first surface of each said filter element.

9. A method as claimed in claim 8, wherein the volume of gaseous combustion products are provided at a temperature essentially corresponding to the temperature of the particulate-laden process gas stream by the combustion of a fuel-air mixture.

10. A method as claimed in claim 9, including the steps of selecting the volume of the fuel-air mixture and the ratio of the fuel to the air in the mixture to provide the volume of gaseous combustion products at a pressure and for a duration adequate to effect said flow of the gaseous combustion products through the filter elements.

11. A method as claimed in claim 10, including the steps of providing pressure drop means for each of said streams to control the rate of flow of the gaseous combustion products defining each of said streams.

12. A method as claimed in claim 10, including the further steps of selecting the ratio of the fuel to the air in the mixture to provide a fuel-rich or fuel-lean mixture for producing gaseous combustion products of a reducing or an oxidizing nature corresponding to that of the particulate-laden process gas.

13. A method as claimed in claim 11, wherein the volume of gaseous combustion products is at a pressure greater than that of the particulate-laden process gas for providing said flow of the gaseous combustion products through each of said filter elements when the particulate-laden gas is in the first zone.

14. A method as claimed in claim 8, wherein the gas-permeable filter elements are provided by tubular elongated ceramic filters vertically supported in the pressure vessel means.

* * * * *